(12) United States Patent
Shreeve et al.

(10) Patent No.: US 7,457,026 B2
(45) Date of Patent: Nov. 25, 2008

(54) LIGHT MODULATOR DEVICE

(75) Inventors: Robert W. Shreeve, Pullman, WA (US);
Steve P. Hanson, Albany, OR (US);
Timothy R Emery, Corvallis, OR (US);
George Radominski, Corvallis, OR
(US); Martha A. Truninger, Corvallis,
OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 11/225,319

(22) Filed: Sep. 12, 2005

(65) Prior Publication Data
US 2007/0058236 A1    Mar. 15, 2007

(51) Int. Cl.
*G02F 1/03* (2006.01)
(52) U.S. Cl. .................. 359/245; 359/290; 359/302; 359/263; 359/247
(58) Field of Classification Search .................. 359/245
See application file for complete search history.

(56) References Cited

U.S. PATENT DOCUMENTS

| | | | | |
|---|---|---|---|---|
| 5,926,309 | A * | 7/1999 | Little | 359/293 |
| 6,346,776 | B1 * | 2/2002 | Robinson et al. | 315/169.3 |
| 6,891,652 | B2 | 5/2005 | Fujimori et al. | |
| 6,906,840 | B1 | 6/2005 | Fujimori et al. | |
| 7,212,328 | B2 * | 5/2007 | Jilani et al. | 359/291 |
| 2006/0284541 | A1 * | 12/2006 | Faase et al. | 313/364 |

* cited by examiner

*Primary Examiner*—Jessica T Stultz (57) ABSTRACT

A light modulator array includes a plurality of light modulator devices, each the light modulator device including a resistor, a conductor coupled to a first end of the resistor, a post coupled to a second end of the resistor, and a reflective plate supported by the post, an insulator separating a first of the modulator devices from an adjacent light modulator device, and an energy penetration reducer configured to prevent the insulator from becoming conductive in a region between a resistor of the first light modulator device and a conductor of the adjacent device.

23 Claims, 7 Drawing Sheets

LIGHT MODULATOR DEVICE

BACKGROUND

Micro-electromechanical systems (MEMS) are used in a variety of applications, including optical display systems. Such systems often include a light source that projects light rays onto a light modulator panel. In many optical display systems, the light modulator panel includes an array of MEMS devices commonly referred to as pixels. The pixels modulate light to control its color, intensity, hue, or other characteristics.

For example, some pixels include reflective plates that are selectively tilted to direct light along a desired path. More specifically, when such pixels are in an ON state, the reflective plate is tilted such that the pixels direct light incident thereon to the display optics, which focus the light onto a display surface. Similarly, when such pixels are in an OFF state, the reflective plate is oriented such that the light is directed away from the display surface. By controlling the frequency with which the light is directed from each pixel to the display surface, each pixel is able to produce an output that varies from light to dark on the display surface. By properly controlling an array of pixels, a full image may be formed.

Some systems activate a pixel by selectively charging the reflective plate. The charge on the reflective plate creates an electrostatic force that causes the reflective plate to tilt. The charge is frequently provided by a charge source, such as an electron gun that selectively directs an electron beam to the pixel. An insulator is frequently provided between adjacent pixels to reduce the possibility that charge from one pixel will flow to an adjacent device. Such insulators may become partially conductive when subjected to the electron beam. If the insulator becomes sufficiently conductive, charge may unintentionally flow from one pixel to another, thereby reducing the effective operation of the intended pixel.

SUMMARY

A light modulator array includes a plurality of light modulator devices, each the light modulator device including a resistor, a conductor coupled to a first end of the resistor, a post coupled to a second end of the resistor, and a reflective plate supported by the post, an insulator separating a first of the modulator devices from an adjacent light modulator device, and an energy penetration reducer configured to prevent the insulator from becoming conductive in a region between a resistor of the first light modulator device and a conductor of the adjacent device.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Light modulator devices and assemblies are provided herein for use in display systems. According to several exemplary embodiments, a light modulator device is activated by selectively charging a reflective plate, thereby causing the reflective plate to tilt. For example, an electron beam may be selectively directed to a light modulator device to thereby charge the reflective plate. The reflective plate is separated from a conductor by a capacitive gap. The conductor is coupled to a resistor, the resistor is coupled to a post, and the post is coupled to a reflective plate. Thus, a resistor-capacitor (RC) circuit is formed. Electrostatic forces between the reflective plate and the charge plate causes the reflective plate to tilt. The charge from the reflective plate is then directed through a post and a resistor to the conductor, which directs the charge to ground. The RC configuration slows the flow of charge from the reflective plate to the conductor. The slowed flow of charge allows the reflective plate to remain tilted, and thus allows the light modulator device to remain on. The time the reflective plate remains tilted depends, at least in part, on the magnitude of the charge that accumulates on the reflective plate.

According to several exemplary embodiments, each of the light modulator devices may be separated from adjacent devices by an insulator. The insulators also separate the post and one end of the resistor from the conductor. Such insulators may become conductive when exposed to an electron beam. The depth to which the electron beam penetrates, and thus the depth to which the insulator becomes conductive, depends, at least in part, on the energy of the electron beam when the electron beam hits the insulator. The light modulator assembly or array includes an energy-penetration reduction configuration, which reduces the possibility that the electron beam will cause the insulator to become conductive. For example, the energy-penetration reduction configuration may reduce the possibility that the insulator will become conductive in the region between a conductor and a post and/or resistor within the same device and that the insulator will become conductive in the region between a conductor of one device and the resistor and/or post of an adjacent device.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
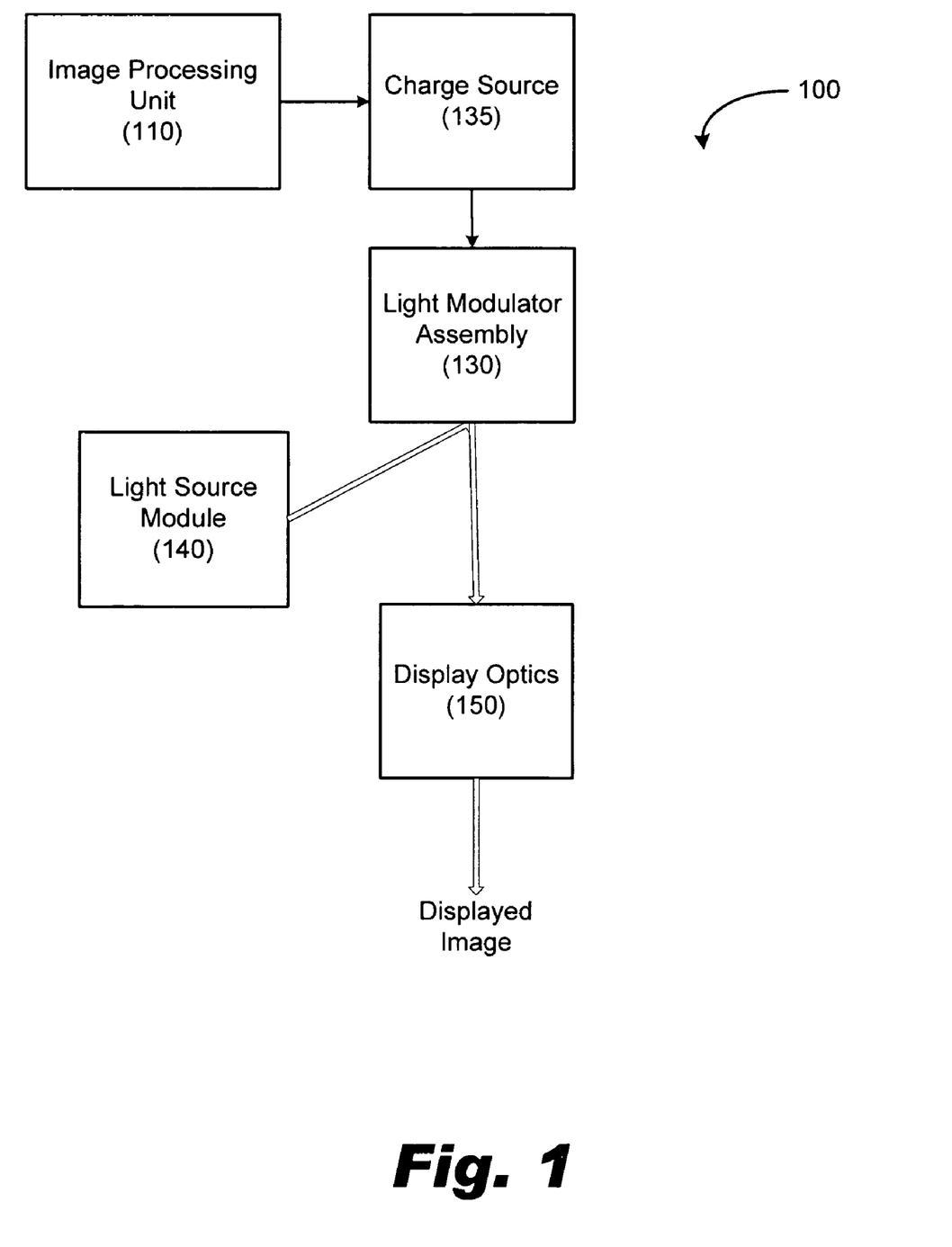
FIG. 1 illustrates a schematic view of a display system according to one exemplary embodiment.

FIG. 1 illustrates a schematic view of a system (100) according to one exemplary embodiment. For ease of reference, the system will be described with reference to a display application. Those of skill in the art will appreciate that such a system may be used in communication applications, such as in optical switching applications. The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110). The image processing unit (110) performs various functions including controlling the operation of a light modulator assembly (130). In particular, as will be discussed in more detail below, the image processing unit (110) controls the operation of a charge source (135), which in turn controls the operation of the light modulator assembly (130).

The light modulator assembly (130) includes one or more arrays of light modulator devices. The light modulator devices may be in the form of micro-electro mechanical system (MEMS) devices, or pixels, which are configured to selectively reflect light incident thereon toward a display, as discussed below. The incident light may be modulated in its color, phase, intensity, polarization, or direction by the light modulator assembly (130). The light modulator assembly (130) includes a plurality of individual light modulator devices. For example, one exemplary light modulator device includes a post and mirror that supports the mirror above a charge plate.

The image processing unit causes the charge source (135) to selectively direct charge to activate individual pixels on the light modulator assembly (130). In particular, charge from the charge source (135) causes a mirror in a pixel to tilt. When the mirror is tilted, light from the light source module (140) is directed to the display optics (150) to form part of the displayed image. When the mirror is not activated, the mirror remains in a default position and the light is not directed to the display optics (150), and thus does not form part of the displayed image. By controlling the duration for which the light modulator device is activated, the light modulator device is able to produce an output that varies between light and dark. According to one exemplary embodiment, the light source module (140) generates sequentially-varying light, such as red, green, and blue sequentially-color varying light. As each color is incident on the light modulator assembly (130) the light may be modulated to form a sub-image. By providing sequentially color varying light, the system is able to produce sequential sub-images, which may be perceived as a single full-color image.

As introduced, one exemplary light modulator includes a mirror that is activated by having a charge established thereon. According to one exemplary embodiment, the charge is conveyed to the mirror by an electron gun, which bombards the mirror with electrons. Each light modulator device is separated by an insulating material. The insulating material covers the space between each light modulator device and helps isolate each light modulator device from adjacent light modulator devices. Further, insulating material within each device helps ensure the device functions properly. As will be discussed in more detail, the display system includes an energy-penetration reduction configuration. For example, according to one exemplary embodiment, an energy penetration reducer is provided for the space between adjacent mirrors. The energy penetration reducer reduces or minimizes the ability of electrons from the electron gun that are able to reach the insulating material between each light modulator device. By minimizing the number of electrons that reach the insulating material, the energy penetration reducer minimizes or reduces the possibility that the insulating material will become conductive and thus conduct between adjacent light modulator devices.

Light Modulator Array

Figure 2:
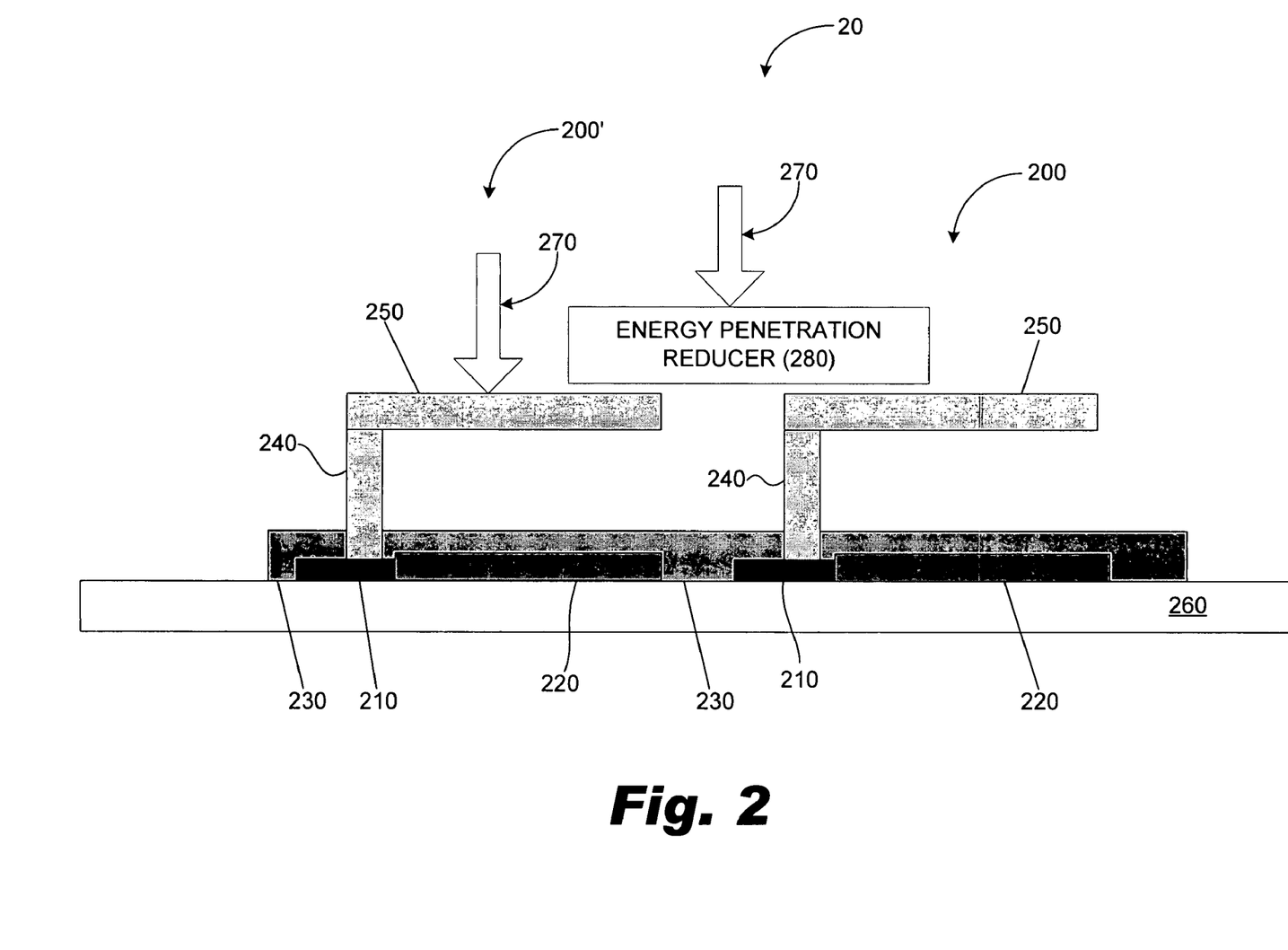
FIG. 2 illustrates a schematic view of an array of light modulator devices according to one exemplary embodiment.

FIG. 2 illustrates a light modulator array (20) that includes a light modulator device (200) according to one exemplary embodiment. In particular, FIG. 2 illustrates a schematic view of the light modulator device (200) and an adjacent light modulator device (200'). Each light modulator device (200, 200') includes a resistor (210), a conductor (220), an insulator (230), a post (240), and a reflective plate (250). The resistor (210) is formed on a substrate (260). For ease of reference, operation of a single light modulator device (200) will be discussed with reference to the light modulator array (20). The light modulator device (200) has an electron beam (270) selectively directed thereto. As will be discussed in more detail below, the electron beam (270) charges the reflective plate (250), thereby causing it to tilt. While the reflective plate (250) is tilted, the light modulator device (200) is in an on state. Further, as will be discussed in more detail below, the light modulator array (20) includes an energy penetration reducer, depicted schematically as block (280).

The energy penetration reducer (280) minimizes the number of electrons that penetrate the insulator (230) around the perimeter of the resistor (210). As a result, the energy penetration reducer (280) reduces or minimizes the undesired flow of charge from the reflective plate (250) of the light modulator device (200) to an adjacent light modulator device (200'). Such an undesired flow of charge may be referred to as parasitic charge leakage.

The resistor (210) is formed on the substrate (260). The post (240) is coupled to one end of the resistor (210) and the reflective plate (250). The post (240) supports the reflective plate (250) over the substrate (260) and provides an electrical pathway between the reflective plate (250) and the resistor (210). According to one exemplary embodiment. The substrate (260) is substantially transparent. According to such an embodiment, light directed to the light modulator array (20) travels through the substrate (260) to the reflective plate (250). For ease of reference, the portion of the reflective plate (250) near the post (240) shall be referred to as the proximal end, while the opposite end shall be referred to as the distal end. The conductor (220) is coupled to the opposite end of the resistor (210) and is further coupled to ground. The insulator (230) surrounds the perimeter of the resistor (210) and electrically separates the post (240) from the conductor (220) of an adjacent device. The insulator (230) also separates post (240) and the proximal end of the resistor (210) from the conductor (220). Further, the insulator (230) separates the reflective plate (250) from the conductor (220) when the reflective plate (250) is tilted.

For ease of reference, the distance or gap between the reflective plate (250) and the conductor (220) shall be referred to as a "capacitance gap." As introduced, the reflective plate (250) may have an electron beam (270) selectively directed thereon. The electron beam (270) may be directed to the reflective plate (250) from any suitable source, such as an electron gun, as is well known to those of skill in the art.

As electrons from the electron beam (270) strike the reflective plate (250), a charge accumulates on the reflective plate (250). For example, according to one exemplary embodiment, electrons accumulate on the reflective plate (250), thereby establishing a negative charge on the reflective plate. In addition, bombarding the reflective plate (250) may drive electrons resident on the reflective plate (250) away, thereby establishing a positive charge on the reflective plate. In either case, the charge from the electron beam (270) may preferentially accumulate on distal end of the reflective plate (250). The conductor (220) is maintained at a lower charge level, such as ground. When a charge differential is established between the reflective plate (250) and the conductor (220), an electrostatic force is established therebetween.

The configuration of the reflective plate (250) and the post (240) causes a moment to be exerted on the reflective plate (250). In particular, the post (240) supports one end of the reflective plate (250) in a cantilever arrangement. As introduced, the charge on the reflective plate (250) establishes an electrostatic force between the charge plate (220) and the reflective plate (250). The force results in a moment on the reflective plate (250). The magnitude of the moment depends on the magnitude of the force acting on the point and the distance of the point from the post (240). As a result, the electrostatic force exerts a moment on the reflective plate (250).

The moment on the reflective plate (250) causes the reflective plate (250) to tilt about the post (240). The degree to which the reflective plate (250) tilts depends, at least in part, on the charge differential between the reflective plate (250) and the substrate (260). As previously discussed, by controlling the rate or frequency of the tilt, the light modulator device (200) is able to modulate light that is incident thereon.

As discussed, the charge from the electron beam (270) may accumulate rapidly on the reflective plate (250). An electrical pathway is defined between the reflective plate (250), the post (240), the resistor (210), and the conductor (220). Further, as previously introduced, a capacitive gap is established between the conductor (220) and the charged reflective plate (250). Thus, the resistor (210) and the capacitive gap form an RC-type circuit. The RC configuration limits how quickly the accumulated charge reaches the conductor (220) where it is shunted to ground, and thus how long the reflective plate (250) remains tilted. A relatively large charge will discharge over a longer period of time while a relatively small charge will discharge over a shorter period of time. Thus, the time the reflective plate (250) remains tilted may be controlled by selecting the amount of charge established thereon.

As previously discussed, the insulator (230) is placed between the light modulator devices (200) and the adjacent device (200'). In particular, the insulator (230) is located around the perimeter of the resistor (210) and the post (240) of an adjacent device. Thus, the insulator (230) electrically isolates each light modulator device (200) from adjacent devices. Further, the insulator (230) reduces the possibility that the reflective plate (250) will come into contact with the conductor (220) when the reflective plate (250) is tilted as well as isolating the post (240) and the proximal end of the resistor (210) from the conductor (220) within the light modulator device (200). Suitable insulators include, without limitation, dielectric materials. Such insulation materials may become conductive when subjected to an electron beam. In particular, the conductivity of these insulation materials depends, at least in part, on the electron density and energy of the electron beam directed thereto. In particular, an electron beam with a high electron energy will penetrate the insulator (230) to a greater depth than an electron beam with a lower electron energy. Hence the depth of the insulator converted to a conductor is a function of the electron beam energy.

If the insulator (230) becomes conductive at a sufficient depth, charge may flow from a charged reflective plate (250), through the post (240), the resistor (210), the then-conductive insulator around the perimeter of the resistor (210) to the conductor (220) of an adjacent device and quickly to ground. As a result, under such circumstances, a parallel electrical pathway is established for the charge on the reflective plate (250) to be discharged. The parasitic charge leakage may cause the reflective plate (250) to be discharged more rapidly. A rapid discharge of the reflective plate (250) may undesirably decrease the time the reflective plate (250) remains tilted, and thus the time the light modulator device (200) is activated. Grey scale, operation or producing an output that varies between light and dark, may be achieved by controlling the duration for which each light modulator device is activated.

The energy penetration reducer (280) is located at least partially between the electron beam (270) and the insulator (230) between the resistor (210) and the conductor (220) of an adjacent device. The energy penetration reducer (280) minimizes the number of charged particles from the electron beam (270) that are incident on the insulator (260). By reducing the number of charged particles that are incident on the charged particles, the energy penetration reducer (280) reduces the energy of the electron beam (270), and thus the depth the electron beam (270) penetrates the insulator (230). Reducing the penetration of the electron beam (270) reduces the possibility that the insulator (230) will become conductive at the depth between the resistor (210) and the conductor (220) of an adjacent device. By reducing the possibility that the insulator (260) will become conductive, the energy penetration reducer minimizes the possibility of parasitic charge loss. Further, each light modulator device (200) is configured to cover a portion of the insulator between conductor and the proximal end of the resistor as well as the post. Several exemplary energy penetration reducer configurations will now be discussed in more detail.

Light Modulator Cover

Figure 3:
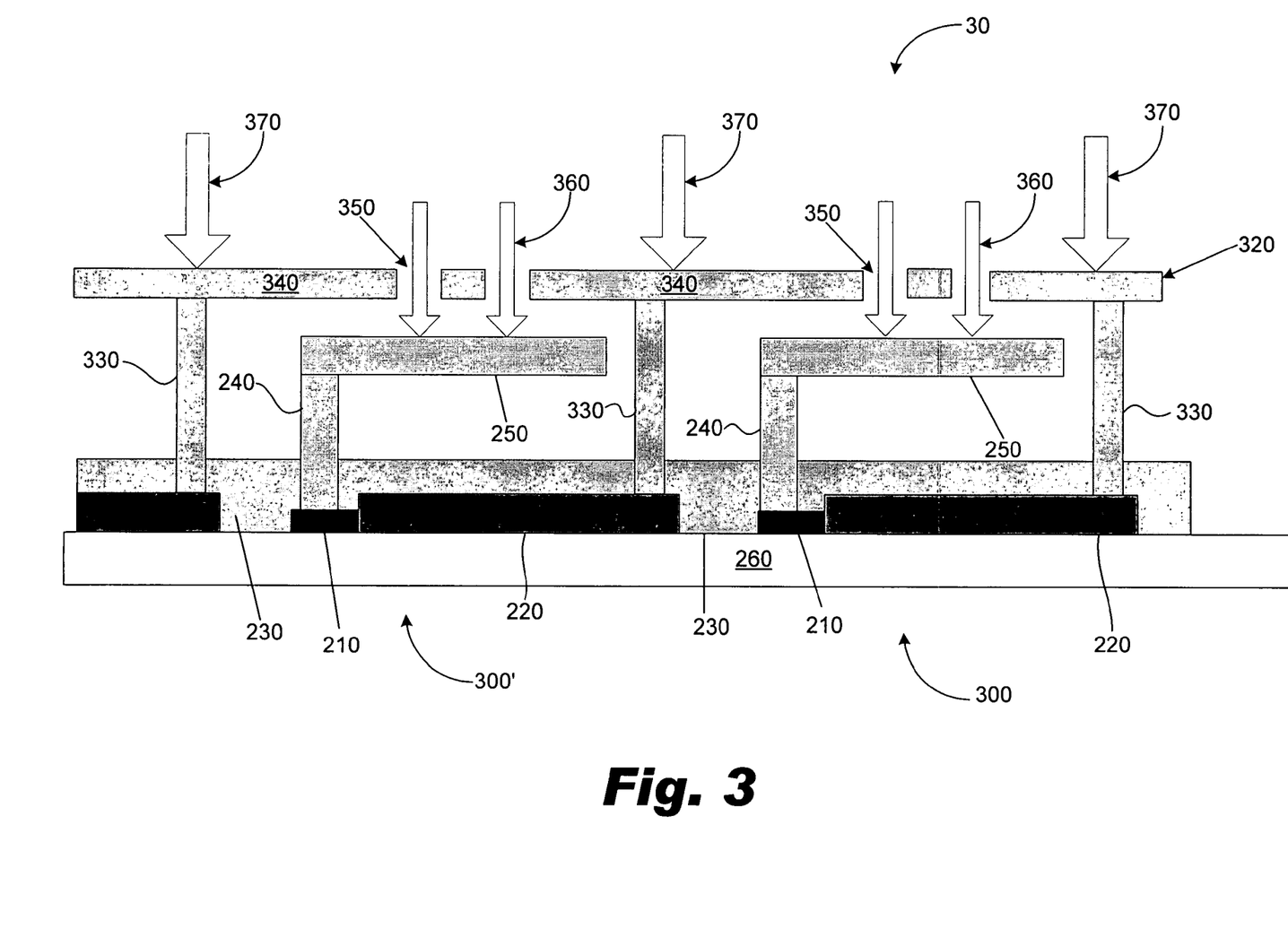
FIG. 3 illustrates a schematic view of an array of light modulator devices according to one exemplary embodiment.

FIG. 3 illustrates a partial cross sectional view of a light modulator array (30) that includes an energy penetration reduction configuration. As shown in FIG. 3, a shield (320) covers the light modulator device (300). The shield (320) reduces the possibility that electrons from an electron beam (370) will undesirably cause parasitic leakage between the light modulator device (300) and an adjacent light modulator device (300').

As shown in FIG. 3, the shield (320) includes supports (330) and a cover (340). The supports (330) support the cover (340) above the light modulator devices (300, 300'). In particular, the supports (330) are coupled to a conductor (220), which is coupled to ground and to the cover (340). Accordingly, the supports (330) couple the cover (340) to ground while supporting the cover (340) over the light modulator devices (300, 300').

The cover (340) includes holes (350) defined therein. The holes (350) provide access to the reflective plates (250) of each light modulator device (300, 300'). More specifically, each hole (350) is located over the reflective plate (250) of a light modulator device (300, 300') such that when an electron beam is incident on the light modulator device (300, 300'), a first portion (360) passes through the cover (340) by way of the holes (350) where that portion is incident on the reflective plate (250). The reflective plate (250) is charged and operates as described above.

A second portion (370) of the electron beam is incident on the cover (340). The cover (340) is formed of a conductive material, such as metallic material. The supports (330) may also be formed of a conductive material. According to such embodiment, when the second portion (370) of the electron beam is incident on the cover (340), the charge associated therewith is directed from the cover (340), through the supports (330), and to the conductor (220).

The conductor (220) is coupled to ground. Thus, the charge associated with the second portion (370) of the electron beam is directed from the cover (340) to ground. As a result, the insulator (230) is substantially shielded from the electron beam while allowing the electron beam to charge the reflective plate (210). By shielding the insulator (230) from the electron beam, the shield (320) reduces the possibility that the insulator (230) will become conductive between the resistor (210) of the light modulator device (300, 300') and an adjacent device. Thus, the shield (320) minimizes parasitic charge leakage.

In addition, the shield (320) reduces the possibility that contaminants will affect the performance of the light modulator device (300) during the formation thereof. In particular, during the formation of the light modulator device, a sacrificial material may be used to form the capacitance gap. As the sacrificial materials are removed, particles may enter the capacitance gap. The cover (340) according to the present exemplary covers the gap between adjacent light modulator devices, thereby minimizing the possibility that contaminants will enter the capacitance gap. Further, according to the present exemplary embodiment, the reflective plate (250) covers the insulator (230) between within each light modulator device (300). Thus, the reflective plate (250) minimizes the penetration of the electron beam (370) in this region, to thereby isolate the post (240) and proximal end of the resistor (210) from the conductor (220).

Light Modulator Array with Second Conductors

Figure 4:
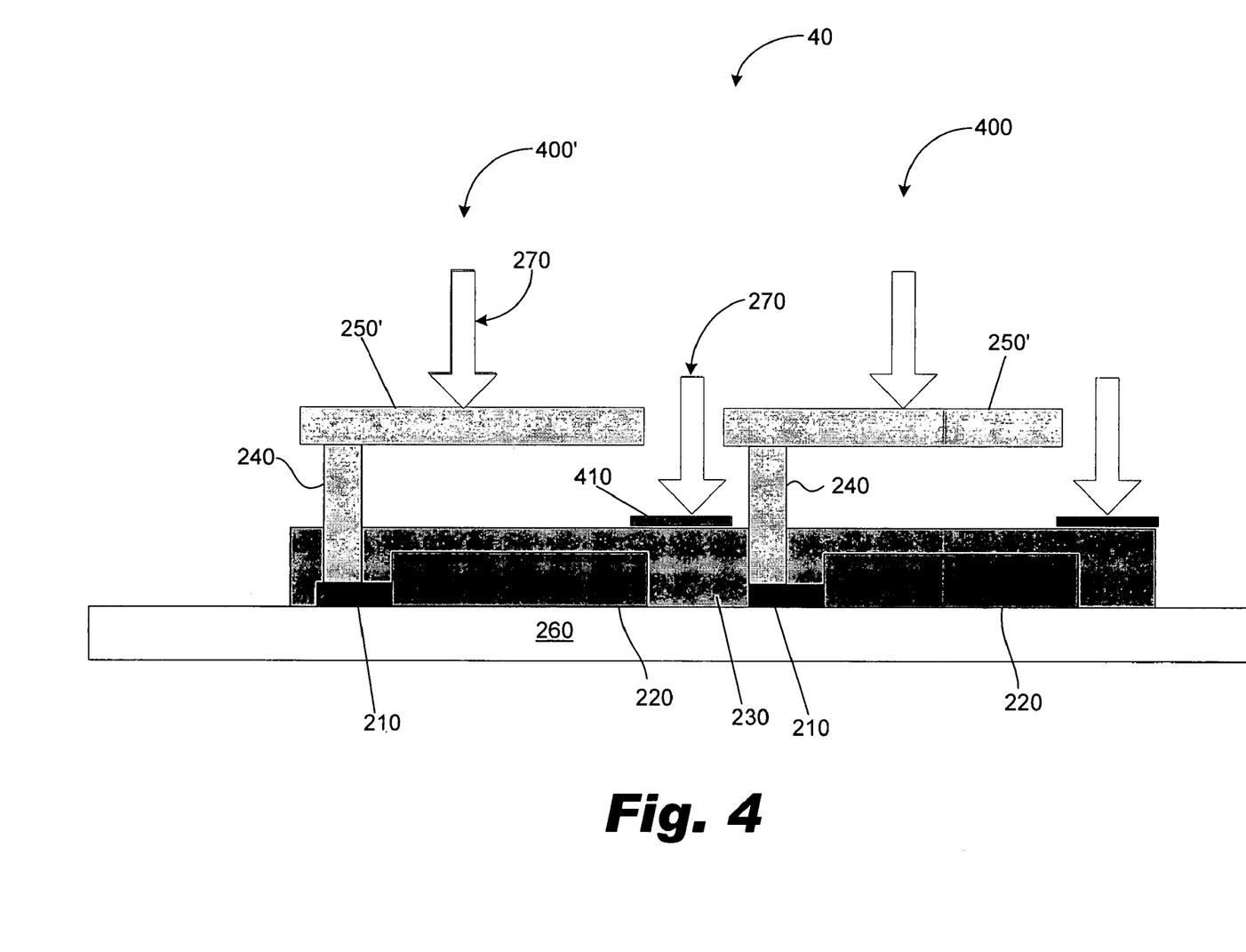
FIG. 4 illustrates a schematic view of an array of light modulator devices according to one exemplary embodiment.

FIG. 4 illustrates a light modulator array (40). The light modulator array (40) will be discussed with reference to a light modulator device (400) and an adjacent light modulator device (400'). According to the present exemplary embodiment, a second conductor (410) is as shown in FIG. 4, the reflective plate (250') is disposed on and is sized to substantially cover the resistor (210) and the insulator (230) about the perimeter of the resistor (210). Further, according to such an exemplary embodiment, the conductor (220) may be exposed. According to such an embodiment, an electron beam (270) scanned to the light modulator device (400) will be incident on either the reflective plate (250') or the second conductor (410). The second conductor (410) may then be coupled to ground, such that charge from the electron beam is directed to ground.

The reflective plate (250') minimizes the possibility that the electron beam (270) will penetrate the insulator within the light modulator device (400). Charge from the electron beam on the reflective plate (250') causes the reflective plate (250') to tilt, as previously discussed. Charge from the electron beam that is incident on the second conductor (410) will be shunted to ground. Such a configuration may minimize the amount of energy that reaches the insulator (230) between the resistor (210) and the conductor (220) of the adjacent device (400') from an electron beam (270) directed to the light modulator device (400).

Light Modulator Array with Sized-Reflective Plates

Figure 5:
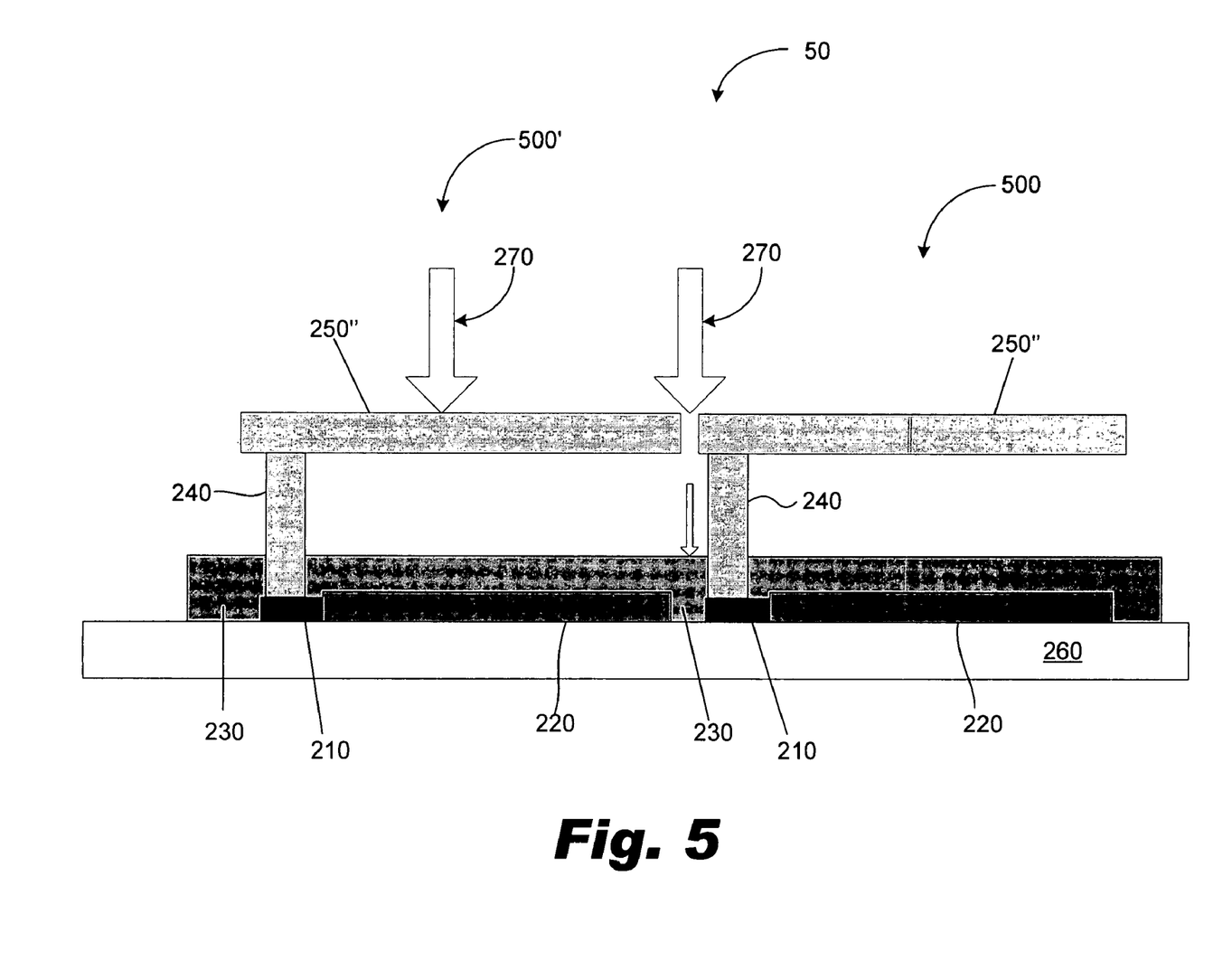
FIG. 5 illustrates a schematic view of an array of light modulator devices according to one exemplary embodiment.

FIG. 5 illustrates an array (50) of light modulator device (500) in which a reflective plate (250") substantially covers the resistors (210), but only covers a portion of the insulator (230) around the perimeter of the resistor (210). According to such an embodiment, the reflective plate (250") at least partially covering the insulator (230) about the perimeter of the resistor (210). By partially covering the insulator (230), the reflective plate (250") reduces concentration of the energy that reaches the insulator (230) between the resistor (210) on the light modulator device (500) and the conductor (220) of an adjacent device. Further, the reflective plate (250") minimizes the possibility that the electron beam (270) will penetrate the insulator (230) within the light modulator device (400). According to the present exemplary embodiment, the reduction in the energy concentration is sufficient to minimize the possibility that the insulator (230) will allow parasitic leakage between the light modulator device (500) and an adjacent device (500').

Light Modulator Array with Thick Insulator Layer

Figure 6:
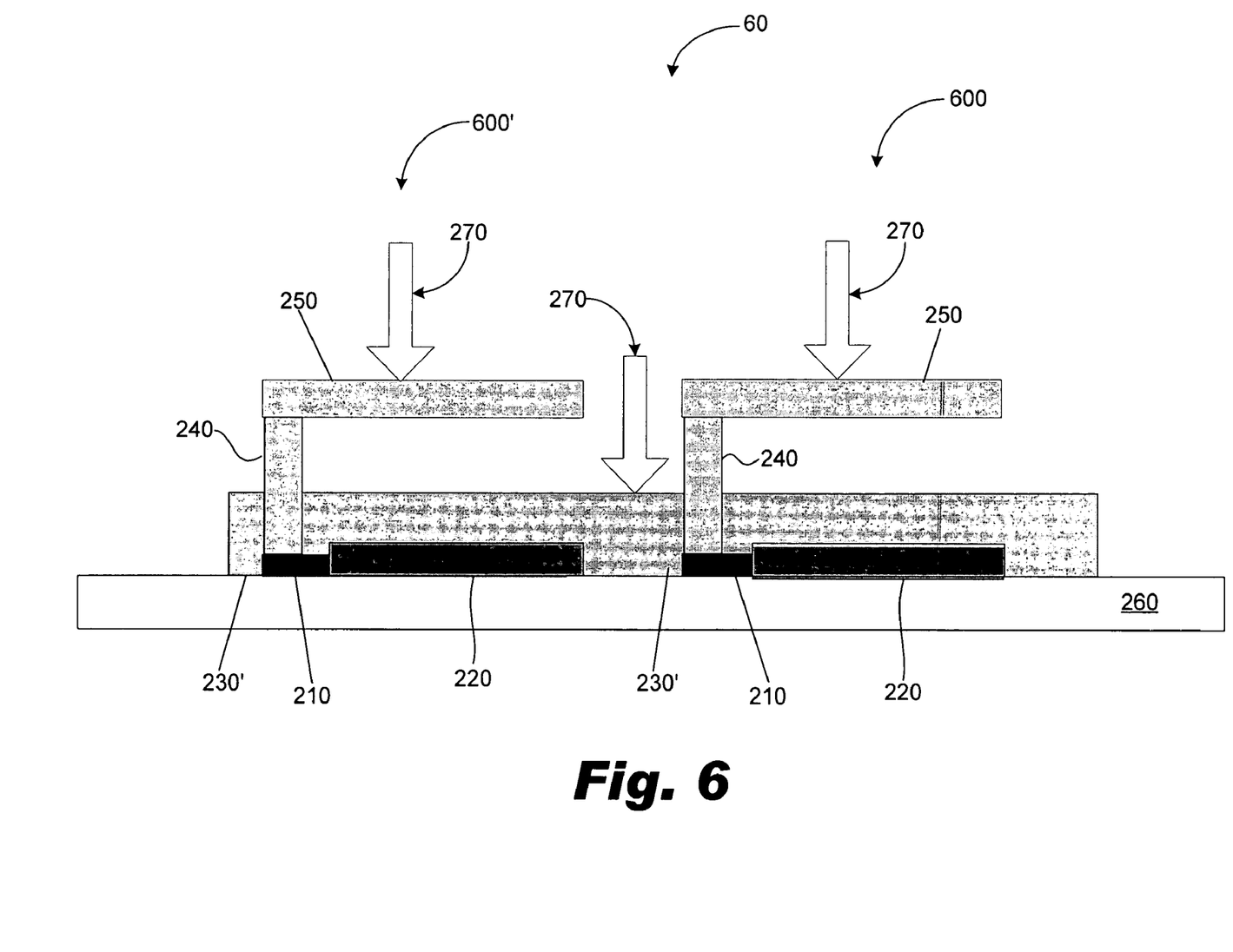
FIG. 6 illustrates a schematic view of an array of light modulator devices according to one exemplary embodiment.

Further, FIG. 6 illustrates an array (60) of light modulator device (600) that includes a relatively thick insulator (230'), according to one exemplary embodiment. According to such an embodiment, the relatively thick insulator (230') between the light modulator device (600) and an adjacent device (600') provides energy penetration reduction. In particular, as previously introduced, the depth to which electrons from the electron beam penetrates an insulator, and thus the depth to which the insulator is conductive, depends on the energy of the electron beam. Thus, the insulator (230') may have a sufficient thickness such that the electron beam does not penetrate to the portion of the insulator (230') between the resistor (210) and the conductor (220) of an adjacent device. Thus, according to the present exemplary embodiment, the insulator (230') between the light modulator device (600) and an adjacent light modulator device (600') minimizes the possibility that the electron beam (270) will cause the insulator (230') to become conductive in the region of the insulator (230') between the resistor (210) of the light modulator device (600) and the adjacent light modulator device (600').

Method of Forming a Light Modulator Device

Figure 7:
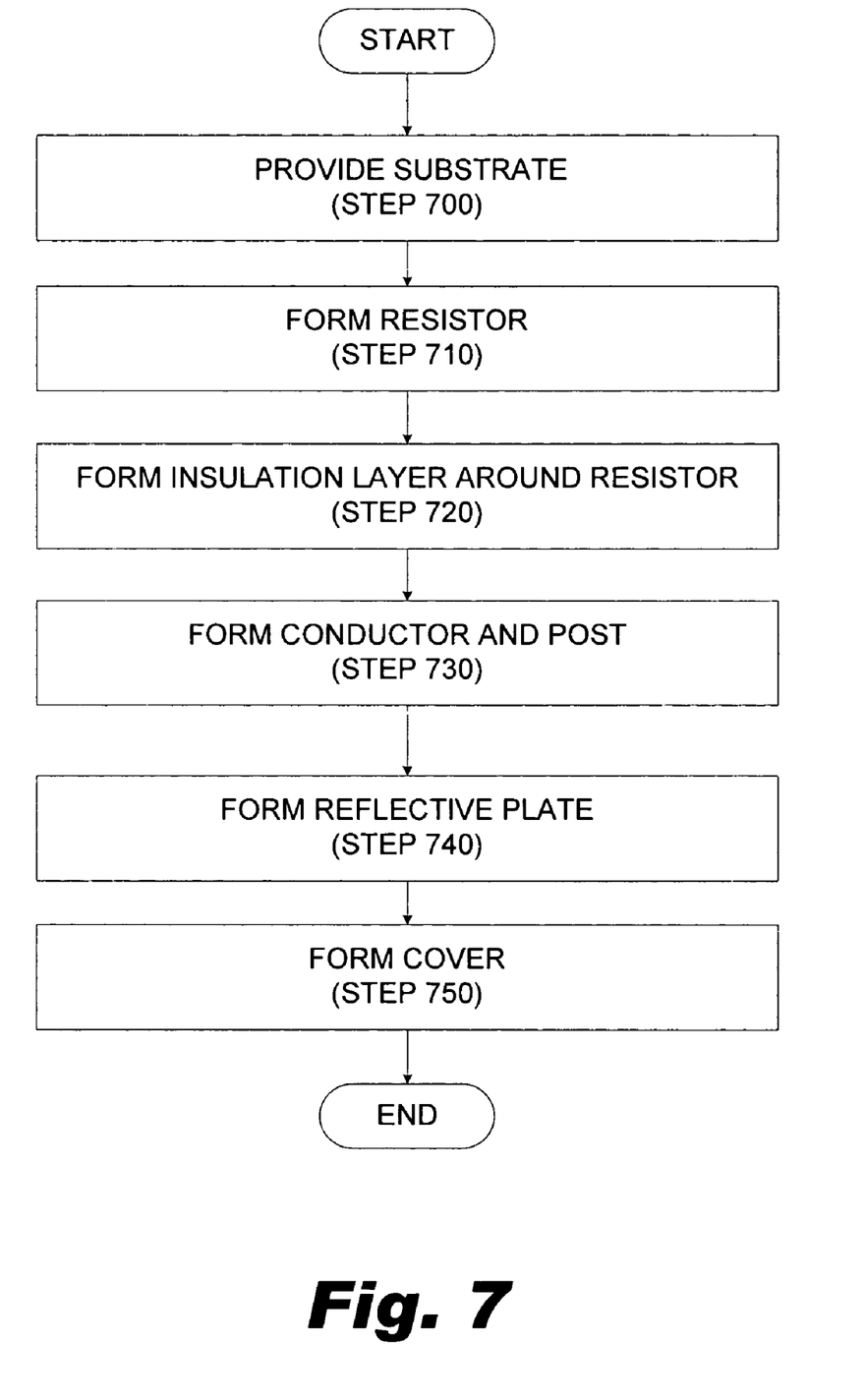
FIG. 7 is a flowchart illustrating a method of forming a light modulator device according to one exemplary embodiment.

FIG. 7 illustrates a method of forming a light modulator device according to one exemplary embodiment. While certain steps are described herein, those of skill in the art will appreciate that the steps may be performed in different order and/or steps may be omitted. As will be discussed in more detail, one or more energy penetration reducers may be formed at several points of the present exemplary embodiment. Reference to exemplary structures previously discussed will therefore be made in discussing various alternative steps. Those of skill in the art will appreciate that the other structures may be formed by the various steps, and the structure referenced should in no way be construed as limiting.

The present exemplary method begins by providing a substrate (step 700). The substrate may be formed of a substantially transparent material. Further, the substrate may have a circuit formed there, such as a CMOS/bipolar analog and/or digital circuit. According to one exemplary embodiment, the circuit includes electrical nodes, which may be coupled to ground.

A resistor is then formed on the substrate (step 710). In particular, well-known deposition/photo/etch processes may be used to form the resistor. For ease of reference, the formation of individual layers discussed below will be discussed with reference to deposition/photo/etch processes. The resistor may be formed of any suitable material.

An insulation layer may then be formed around the resistor (step 720). For example, it may be desirable to form a thin layer of tetraethylorthosilicate (TEOS) Oxide around the perimeter of the resistor. According to one exemplary method, the TEOS Oxide may be sufficiently thick to minimize penetration of an electron beam between a conductor and the post and/or resistor of an adjacent device. Thus, according to one exemplary method, a relatively thick layer of TEOS Oxide may be formed to act as an energy penetration reducer.

A conductor and post are then formed (step 730). According to one exemplary embodiment, the conductor is formed such that it contacts one end of the resistor while the post is formed such that the post contacts the opposite end of the resistor. Further, as the conductor and the post are formed, a layer of insulator remains around the perimeter of the resistor where the resistor is not in contact with the conductor. According to one exemplary embodiment, the post and conductor may be formed in a single process.

Thereafter, a reflective plate is formed (step 740). According to one exemplary embodiment, formation of the reflective plate includes forming a sacrificial layer on lower layers to provide a capacitive gap. The reflective plate may be a layer of aluminum. The reflective plate may be formed of a size that covers a substantial portion of both the resistor and the insulator surrounding the resistor as described with reference to FIG. 5. Additionally, the reflective plate may be formed of size to cover the resistor, the conductor, and a portion of the insulator surrounding the resistor. One such exemplary reflective plate is discussed above with reference to FIG. 6.

To this point, several possible energy penetration reducing configurations have been discussed, including a relatively thick insulator and a reflective plate sized to cover the resistor and at least a portion of the insulator around the perimeter of the resistor. Such energy penetration reducing configurations may be provided separately or in any combination. Further, it may be desirable to provide a separate energy penetration reducing configuration. Such a configuration may include the formation of a cover (step 750). One exemplary cover is discussed above with reference to FIG. 3. A cover may also be provided independently or with any other combination of energy penetration reducing configurations.

The formation of the cover includes the formation of supports and a cover. The supports may be formed by etching to the conductor, or the supports may be built up on the conductor as the rest of the light modulator device is formed. A cover is formed on top of the supports, which includes at least one hole formed over the reflective plate. The cover may also be made of a metallic material. As a result, charge from an electron beam directed at the light modulator device is either passed through the hole and is incident on the reflective plate or is incident on the cover. Charge from the incidence of the electron beam on the cover is directed from the cover to the supports, from the supports to the conductor, and from the conductor to ground. Thus, the present method provides for the formation of a light modulator device with one or more energy penetration reducing configurations.

Light modulator devices and assemblies are provided herein for use in display systems. According to several exemplary embodiments, a light modulator device is activated by selectively charging a reflective plate, thereby causing the reflective plate to tilt. For example, an electron beam may be selectively directed to a light modulator device to thereby charge the reflective plate. The charge from the reflective plate is then directed through a post and a resistor to a conductor, which directs the charge to ground. The resistor slows the flow of charge from the reflective plate to the conductor. The slowed flow of charge allows the reflective plate to remain tilted, and thus allows the light modulator device to remain on.

According to several exemplary embodiments, each of the light modulator devices may be separated from adjacent devices by an insulator. Such insulators may become conductive when exposed to an electron beam. The depth to which the electron beam penetrates, and thus the depth to which the insulator becomes conductive, depends, at least in part, on the energy of the electron beam when the electron beam hits the insulator. The light modulator assembly or array includes an energy penetration reducing configuration, which reduces the possibility that the electron beam will cause a light modulator device to become conductive in the region between a resistor and/or post of one light modulator device and the conductor of an adjacent device.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light modulator array, comprising:
a plurality of light modulator devices, each said light modulator device including a resistor, a conductor coupled to a first end of said resistor, a post coupled to a second end of said resistor, and a reflective plate supported by said post;
an insulator separating a first of said modulator devices from an adjacent light modulator device; and
an energy penetration reducer that is configured to shield a region of said insulator between a resistor of said first light modulator device and a conductor of said adjacent device from an electron beam without structural support from said post.

2. The light modulator array of claim 1, wherein said energy penetration reducer comprises supports separate from said posts and coupled to said conductor and a cover coupled to said supports.

3. The light modulator array of claim 2, wherein said cover is supported above said light modulator devices and further includes a plurality of holes defined therein, said holes being located to provide a pathway for an electron beam to said reflective plates.

4. The light modulator array of claim 1, and said energy penetration reducer includes a second conductor.

5. The light modulator array of claim 1, wherein said energy penetration reducer includes an insulator sufficiently thick to prevent an electron beam directed to said light modulator array from penetrating to said region between said resistor of said first light modulator device and said conductor of said adjacent device.

6. The light modulator array of claim 1, wherein said insulator includes a dielectric material.

7. The light modulator array of claim 1, wherein said conductor is coupled to ground.

8. The light modulator array of claim 1, wherein said reflective plate is comprised of aluminum.

9. A system, comprising:
a light modulator assembly including a light modulator array with a plurality of light modulator devices, each of said light modulator devices including a resistor, a conductor coupled to a first end of said resistor, a post coupled to a second end of said resistor, and a reflective plate supported by said post;
an insulator separating a first of said modulator devices from an adjacent light modulator device; and
a light source in communication with a first side of said light modulator assembly;
a charge source in communication with a second side of said light modulator assembly, said second side being opposite said first side, said charge source configured to direct an electron beam at said light modulator assembly; and
an energy penetration reducer configured to shield a region of said insulator between said resistor of said first light modulator device and said conductor of said adjacent device from said electron beam without structural support from said post.

10. The system of claim 9, wherein said charge source includes an electron gun.

11. The system of claim 9, wherein said system comprises a display system.

12. The system of claim 11, wherein said light source is configured to generate sequentially color-varying light.

13. The system of claim 9, wherein said light modulator array is formed on a transparent substrate.

14. The system of claim 9, wherein said light modulator array includes a reflective-type light modulator array.

15. The system of claim 9, wherein said system comprises a communication system.

16. A method of forming a light modulator array, comprising:

forming a plurality of light modulator devices, wherein forming each of said light modulator device includes providing a substrate; forming a resistor; forming an insulator around at least a portion of a perimeter of said resistor; forming a conductor coupled to said resistor; forming a post coupled to said resistor; forming a reflective plate on said substrate, and providing an energy penetration reducer to shield a region of said insulator between said resistor and a conductor of an adjacent light modulator device from parasitic charge leakage without structural support from said post.

17. The method of claim 16, wherein providing an energy penetration reducer includes forming supports separate from said post and coupled to said conductor and a cover covering a space between said light modulator device and said adjacent light modulator device.

18. The method of claim 16, wherein providing said energy penetration reducer includes forming a second conductor disposed on said insulator.

19. The method of claim 16, wherein providing said energy penetration reducer includes fanning an insulator of sufficient thickness to prevent an electron beam from causing said insulator from becoming conductive in a region between said light modulator device and said adjacent light modulator device.

20. A light modulator array, comprising;

a plurality of light modulator devices, each said light modulator device including a reflective plate supported by a post and means for causing said reflective plate to tilt in response to a charge directed thereto from a charge source;

isolating means for isolating a light modulator device from an adjacent said light modulator device; and means for reducing penetration of energy from said charge source to a region of said isolating means between said light modulator device and said adjacent light modulator device, wherein said means for reducing penetration of energy are physically separate from both said reflective plates of said light modulator device and posts for supporting said reflective plates.

21. The light modulator array of claim 20, and further comprising means for discharging charge accumulated on said reflective plate from said charge source.

22. The light modulator array of claim 4, wherein said second conductor is positioned above said insulator and conductor and between said light modulators to prevent an electron beam directed to said light modulator array from electrically charging said insulator between said resistor of said first light modulator device and said conductor of said adjacent device.

23. The light modulator array of claim 22, wherein said second conductor is grounded.

* * * * *

UNITED STATES PATENT AND TRADEMARK OFFICE
CERTIFICATE OF CORRECTION

PATENT NO. : 7,457,026 B2
APPLICATION NO. : 11/225319
DATED : November 25, 2008
INVENTOR(S) : Robert W. Shreeve et al.

It is certified that error appears in the above-identified patent and that said Letters Patent is hereby corrected as shown below:

On the title page, item (75), in "Inventors", in column 1, line 1, delete "Pullman, WA" and insert -- Moscow, ID --, therefor.

In column 12, line 2, in Claim 19, delete "fanning" and insert -- forming --, therefor.

Signed and Sealed this

Twenty-third Day of June, 2009

JOHN DOLL
*Acting Director of the United States Patent and Trademark Office*